(12) United States Patent
Kunimochi

(10) Patent No.: US 8,651,721 B2
(45) Date of Patent: Feb. 18, 2014

(54) PLANAR ILLUMINATION APPARATUS

(75) Inventor: Toru Kunimochi, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 13/584,383

(22) Filed: Aug. 13, 2012

(65) Prior Publication Data

US 2013/0070476 A1    Mar. 21, 2013

(30) Foreign Application Priority Data

Sep. 15, 2011   (JP) .................................. 2011-202004

(51) Int. Cl.
*F21V 7/04*  (2006.01)
(52) U.S. Cl.
USPC ......... 362/606; 362/97.3; 362/97.1; 362/612; 362/631; 362/609
(58) Field of Classification Search
USPC ................ 362/97.1–97.3, 606, 609, 612, 631
See application file for complete search history.

(56) References Cited

U.S. PATENT DOCUMENTS

| | | | |
|---|---|---|---|
| 7,898,614 B2 * | 3/2011 | Mishima et al. ................. | 349/65 |
| 8,197,113 B2 * | 6/2012 | Park et al. ...................... | 362/631 |
| 8,434,909 B2 * | 5/2013 | Nichol et al. ............ | 362/296.01 |
| 2010/0177489 A1 * | 7/2010 | Yagisawa ...................... | 361/752 |
| 2013/0242541 A1 * | 9/2013 | Kim et al. .................... | 362/97.1 |

FOREIGN PATENT DOCUMENTS

| JP | A-2007-128820 | 5/2007 |
|---|---|---|
| JP | A-2009-216753 | 9/2009 |

* cited by examiner

*Primary Examiner* — Anabel Ton
(74) *Attorney, Agent, or Firm* — Oliff PLC

(57) ABSTRACT

A planar illumination apparatus includes: a light source; a light guide plate having a light-receiving end surface arranged facing the light source, an output flat surface for planarly outputting light received through the light-receiving end surface and a reflective flat surface facing the output flat surface; a reflective sheet disposed on the reflective flat surface side of the light guide plate; and a flexible printed circuit board disposed on substantially the same plane as that of the reflective sheet, the flexible printed board mounting the light source, wherein the flexible printed circuit board has a mounting portion on which the light source is mounted and a thin portion which extends from a forward side edge and is formed thinner than the mounting portion, and wherein at least one part of the thin portion and an end portion of the reflective sheet are overlapped with each other.

10 Claims, 4 Drawing Sheets

PLANAR ILLUMINATION APPARATUS

TECHNICAL FIELD

The present invention relates to a planar illumination apparatus, in particular, to a sidelight-type planar illumination apparatus having an light source arranged on an light-receiving end surface and a light guide plate for outputting planar illumination light from an output part.

BACKGROUND ART

As an illumination means for liquid crystal display panel, a sidelight type planar illumination apparatus (back light) in which a small light emitting diode (LED) with excellent environmental adaptability is arranged along an light-receiving end surface of a light guide plate has been widely employed mainly in the field of miniaturized portable information devices such as cell phones. In such a kind of the planar illumination apparatus, LED is generally mounted on a flexible printed circuit board (hereinafter, referred to as "FPC") and arranged along the light-receiving end surface of a light guide plate. In recent years, in connection with a thickness reduction of an information apparatus, a further reduction in thickness of the planar illumination apparatus has been also strongly desired. In addition, the arrangement/configuration of FPC has been proposed in various ways depending on the demand (see, for example, Japanese published unexamined application Nos. 2009-216753 and 2007-128820).

FIG. 5 is a cross-sectional side view illustrating the main part of a planar illumination apparatus described in Japanese published unexamined application No. 2009-216753. The planar illumination apparatus 100 is used as a back light of a liquid crystal panel 120 and includes a light guide plate 116. On the output surface 116a side of the light guide plate 116, an optical compensation sheet 115 composed of a diffusion plate and a prism plate is disposed by lamination. On the back side 116b of the light guide plate 116, a reflective sheet 107 is disposed. In addition, a LED 112 mounted on a FPC 105 is arranged along the light-receiving end surface 116c of the light guide plate 116, and the FPC 105 itself is fixed on a mold frame 106 with a double-sided tape 111.

In the planar illumination apparatus 100, as shown in part A in the figure, the tip of the FPC 105 and the reflective sheet 107 are disposed facing each other (i.e., being faced to each other at a minute interval or butted each other to avoid an increase in thickness due to the lamination of FPC 105 and reflective sheet 107.

FIG. 6 is a cross-sectional side view of the main part of a planar illumination apparatus described in Japanese published unexamined application No. 2007-128820. The planar illumination apparatus 200 is used as a back light of a liquid crystal panel 220 and includes a light guide plate 216. On the output surface 216a side of the light guide plate 216, an optical sheet 215 is disposed by lamination. On the back surface 216b side of the light guide plate 216, a reflective sheet 207 is disposed. A LED 212 mounted on a FPC 205 is arranged along the light-receiving end surface 216c of the light guide plate 216, and the light-receiving end surface 216c side of the light guide plate 216 is housed in a back case 206 together with the LED 212.

In the planar illumination apparatus 200, a thin portion 207a is formed in a reflective sheet 207 and the FPC 205 is then disposed by lamination on the thin portion 207a to avoid an increase in thickness.

SUMMARY OF INVENTION

Technical Problem

However, like the planar illumination apparatus 100 depicted in FIG. 5, in the case of the structure in which the FPC 105 and the reflective sheet 107 are disposed facing each other, a gap can be easily generated at a face-to-face portion. Such a gap will cause light to leak therefrom, and as a result, a decrease in brightness and/or generation of uneven brightness, or the like may occur. Furthermore, when a product with the installed planar illumination apparatus 100 has a function based on operation of a light-receiving component such as an optical sensor, any problem may occur in that, for example, leak light from the planar illumination apparatus 100 may cause malfunction of the product.

On the other hand, like the planar illumination apparatus 200 depicted in FIG. 6, in the case of the arrangement in which the FPC 205 is laminated on the reflective sheet 207, no problem of such a leakage of light occurs. However, there is a problem in the structure where the thin portion 207a is formed in the reflective sheet 207. The problem is as follows: In general, a thinned reflective sheet has a lower reflectivity. Thus, it is not easy to form a thin portion while keeping the reflectivity at a predetermined level. In particular, in order to attain high reflectivity, a reflective sheet having a dielectric multilayer structure, which is suitably used as the above reflective sheet, has a problem in that a significant decreases in reflectivity of a thin portion occurs when the thin portion is formed by reducing the thickness of each layer or decreasing the number of layers.

Furthermore, Japanese published unexamined application No. 2007-128820 describes that the formation of the thin portion 207a in the reflective sheet 207 to laminate and arrange the FPC 205 on the reflective sheet 207 also improves a positional displacement of an optical axis of the LED 212 with respect to a central axis in the thickness direction of the end surface of the light guide plate 216, thereby increasing the incident efficiency from the LED 212 to the light guide plate 216. However, in recent years, demands on accuracy of alignment between the LED 212 and the light guide plate 216 are becoming severe along with a further thickness reduction of the light guide plate. Furthermore, the structure of the planar illumination apparatus 200 depicted in FIG. 6 is compelled to have a positional displacement between the optical axis of the LED 212 and the central axis of the light guide plate 216 in the thickness direction of the end surface thereof, where the displacement is almost equal to the thickness of the thin portion 207a. Thus, such a structure is disadvantageous to attain higher accuracy in alignment.

Furthermore, Japanese published unexamined application No. 2007-128820 describes methods for forming the thin portion 207a in the reflective sheet 207. The methods include a method in which press working on an area of the reflective sheet 207 where the thin portion 207a is to be formed; and a method in which the reflective sheet 207 is configured in the form of a multilayered structure in advance and only the thin portion 207a is then formed into a single-layered structure. However, for example, the press-working method requires an additional step for blanking or the like after the press working because the outline of the reflective sheet 207 is deformed by the press working for forming the thin portion 207a. Thus, there are problems of an increase in number of production steps and an increase in costs.

In the case of employing a method in which the reflective sheet in multilayered structure is prepared using the reflective sheet 207 originally formed in a single-layered structure and the thin portion 207a is then formed in a single-layered structure, the step of forming the reflective sheet 207 in multilayered structure leads to problems of an increase in number of production steps and an increase in costs. As in the case of the reflective sheet having a dielectric multilayer structure, because of a problem of a decrease in reflectivity as described above, it is difficult to employ in practical use the method for forming a thin portion 207a on the reflective sheet 207 originally formed in multilayered structure by partially forming a part of the reflective sheet 207 into a single-layered structure.

The present invention has been made in consideration of the above problems, and intends to provide a planar illumination apparatus which can be easily, cost-effectively formed and is applicable to be made thinner.

Solution to Problem

Aspects of the invention described below exemplify the configuration of the invention and are described in an itemized form to promote easy understanding of a wide variety of configurations of the present invention. Each item does not intend to restrict the technical scope of the present invention. It should be noted that the technical scope of the present invention shall include any modifications by substitution or deletion of part of the structural elements in each item, or addition of any of other structural elements in consideration for the best mode for carrying out the present invention.

A first aspect of the present invention is a planar illumination apparatus comprising a light source; a light guide plate having a light-receiving end surface arranged facing the light source, an output flat surface for planarly outputting light received through the light-receiving end surface and a reflective flat surface facing the output flat surface; a reflective sheet disposed on the reflective flat surface side of the light guide plate; and a flexible printed circuit board disposed on substantially the same plane as that of the reflective sheet, the flexible printed circuit board mounting the light source. The flexible printed circuit board has a mounting portion on which the light source is mounted and a thin portion which extends from a forward side edge of the mounting portion and is formed thinner than the mounting portion. At least one part of the thin portion and an end portion of the reflective sheet are overlapped with each other.

A second aspect of the present invention may be a planar illumination apparatus according to the first aspect, where the flexible printed circuit board comprises a base film, a wiring layer formed on the base film and a cover film laminated on the wiring layer, the thin portion comprises the base film, at least tip side of the thin portion is disposed on the reflective flat surface of the light guide plate, and further thereon the end portion of the reflective sheet is overlapped.

A third aspect of the present invention may be a planar illumination apparatus according to a second aspect, where the forward side edge of the mounting portion on a boundary between the mounting portion and thin portion is located anterior to the light-receiving end surface of the light guide plate.

A fourth aspect of the present invention may be a planar illumination apparatus according to the first aspect, where the flexible printed circuit board includes a base film, a wiring layer formed on the base film and a cover film laminated on the wiring layer, the thin portion comprises the cover film, the thin portion is disposed on the reflective flat surface of the light guide plate, and further thereon the end portion of the reflective sheet is overlapped.

A fifth aspect of the present invention may be a planar illumination apparatus according to the first aspect, where the flexible printed circuit board includes a base film, a wiring layer formed on the base film and a cover film laminated on the wiring layer, the thin portion comprises the base film, the end portion of the reflective sheet is disposed on the reflective flat surface of the light guide plate, and further thereon at least tip side of the thin portion is overlapped.

A sixth aspect of the present invention may be a planar illumination apparatus according to any one of first to fifth aspects, where the thin portion is printed in white or black on its surface facing the reflective flat surface of the light guide plate.

Advantageous Effects of Invention

According to the present disclosure, any configuration described above makes possible to provide a planar illumination apparatus which can be easily, cost-effectively formed and is applicable to be made thinner.

More specifically, the flexible printed circuit board disposed on substantially the same plane as that of the reflective sheet is disposed such that at least part of the thin portion and the end portion of the reflection sheet can be overlapped. Therefore, it is possible to reduce the thickness of the planar illumination apparatus without causing any gap, from which a leakage of light will occur, between the flexible printed circuit board and the reflective sheet. In the planar illumination apparatus of the present disclosure, the flexible printed circuit board has the thin portion. Thus, there is no problem of a decrease in reflectivity due to the fat nation of thin portion on the reflective sheet.

DESCRIPTION OF EMBODIMENTS

Figure 1:
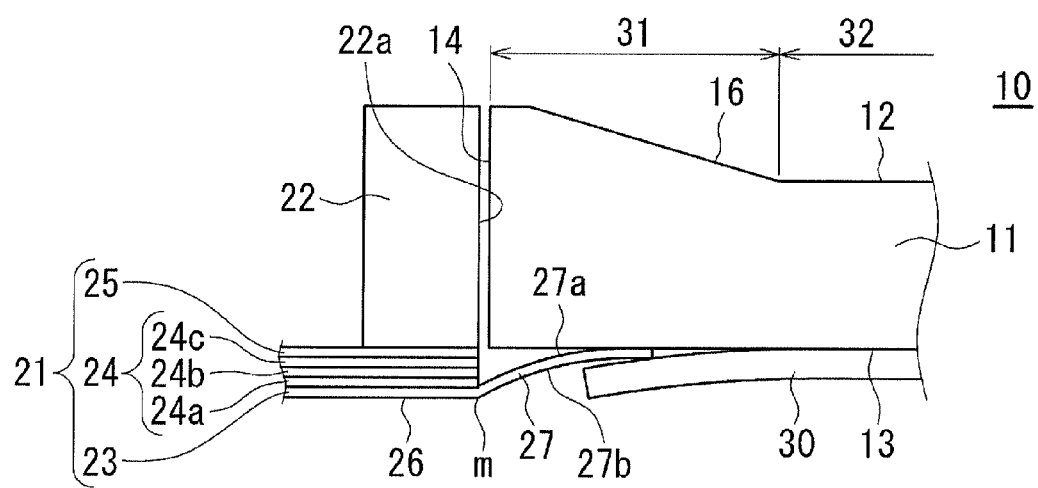
FIG. 1 illustrates a side view of the main part of a planar illumination apparatus according to a first embodiment of the present invention (first aspect).

Hereinafter, embodiments of the present invention will be described with reference to the attached drawings. Here, FIG. 1 illustrates a side view of the main part of a planar illumination apparatus according to a first embodiment of the present invention (first aspect).

The planar illumination apparatus 10 includes a light-emitting diode (hereinafter referred to as "LED") 22 used as a light source, a flexible printed circuit board (hereinafter referred to as "FPC"), and a light guide plate 11 for planarly outputting light the LED 22 emitted. Here, the LED 22 is formed in a rectangular parallelepiped shape as a whole and is provided as a so-called side-view type LED having a light-emitting surface 22a on its side surface. Another surface of the LED 22 is brought into contact with the FPC 21 when the LED 22 is mounted on the FPC 21 (i.e., the mounting surface), and this surface is substantially perpendicular to the light-emitting surface 22a.

The light guide plate 11 is formed of a transparent material (for example, polycarbonate resin) and formed into a generally rectangular shape when viewed from the top thereof. On its one side end surface, a light-receiving end surface 14 is provided. The LED 22 is arranged along the light-receiving end surface 14 while its light-emitting surface 22a is directed to the light-receiving end surface 14. Here, in the planar illumination apparatus 10, with respect to the direction along which the light-emitting surface of the LED 22 is directed (the direction from the light-receiving end surface 14 to the opposite side end surface (not shown) with respect to the light guide plate 11) is defined as "forward".

The light guide plate 11 has an output part 32 from which planar light is outputted after being received from the LED 22 through the light-receiving end surface 14. The output part 32 is formed into a rectangular shape having a constant thickness smaller than that of the light-receiving end surface 14, and one of principal surfaces of the output part 32 is provided as an output flat surface 12. Furthermore, a reflective sheet 30 is disposed on the reflective flat surface 13 side, which is the other of the principal surfaces (back surface) facing the output flat surface 12. On the reflective flat surface 13, for example, an optical path changing pattern composed of a plurality of dots may be formed.

Furthermore, in the planar illumination apparatus 10, a sloped portion 31 is formed between the light-receiving end surface 14 and the output part 32. The sloped portion 31 has a sloped surface 16 extending to the output flat surface 12 by being inclined at a constant gradient so as to be close to the reflective flat surface 13 from the light-receiving end surface 14 side in the forward direction. Therefore, the sloped portion 31 is formed such that the thickness of the light guide plate 11 can be gradually decreased from the light-receiving end surface 14 side to the output part 32 side.

In the planar illumination apparatus 10, the FPC 21 includes a base film 23, a wiring layer 24 formed on the base film 23, and a cover film 25 laminated on the wiring layer 24. In addition, the wiring layer 24 includes a first adhesion layer 24a, a conductive pattern (copper-foil film) layer 24b, and a second adhesion layer 24c, and as a whole provided as a five-layered lamination structure. The wiring layer 24 is disposed substantially on the same plane as that of the reflective sheet 30 along the reflective flat surface 13 of the light guide plate 11.

The FPC 21 includes a mounting portion 26 on which the LED 22 is mounted, and a thin portion 27 extending from the forward side edge of the mounting portion 26 and being formed thinner than the mounting portion 26. In the planar illumination apparatus 10, the thin portion 27 is in the form of a single-layered structure only including the base film 23. Thus the thin portion 27 is formed so that the thickness thereof can be smaller than that of the five-layered mounting portion 26.

Furthermore, in the FPC 21, at least tip side of the thin portion 27 is disposed on the reflective flat surface 13 of the light guide plate 11. In this case, a portion of the thin portion 27 to be disposed on the reflective flat surface 13 may be fixed on the reflective flat surface 13 with any kind of adhesive or sticking means. The reflective sheet 30 is disposed so that the end portion thereof can be disposed over the surface 27b of the thin portion 27 which is opposite to the light guide plate 11.

In the planar illumination apparatus 10, any configuration described above makes possible to reduce the thickness of the planar illumination apparatus 10 without causing any gap, from which a leakage of light will occur, between the FPC 21 and the reflective sheet 30. In this case, since the FPC 21 of the planar illumination apparatus 10 has the thin portion 27, there is no problem of a decrease in reflectivity due to the formation of a thin portion in the reflective sheet 30.

Furthermore, as described above, since the FPC 21 originally has a multi-layered structure of five layers, the FPC 21 having the thin portion 27 can be easily, cost-effectively produced in an ordinal production process without any additional step, material, and the like. That is, the production process for manufacturing ordinary FPCs which do not have thin portions (for example, the process includes lamination of each layer, etching, cutting, and so on) is just carried out so that a single-layered portion to be provided as a thin portion 27 can be retained in the base film 23.

In the planar illumination apparatus 10, the FPC 21 is directly disposed on the light guide plate 11 without the intervening reflective sheet 30 between the FPC 21 and the light guide plate 11. Thus, the thickness of the reflective sheet 30 does not cause a positional displacement between the optical axis of LED 22 and the central axis of the light guide plate 11 in the thickness direction of the light-receiving end surface 14. When the mounting portion 26 of FPC 21 is disposed on a predetermined position, a level difference between the tip side of the thin portion 27, which is disposed on the refractive flat surface 13 of the light guide plate 11, and the base side (mounting portion 26 side) can be eliminated by bending of the thin portion 27 to allocate the mounting portion 26 of FPC 21 to a predetermined position, since the thin portion 27 can be easily bent due to its small thickness. Then, the LED 22 can be arranged along the light-receiving end surface 14 without causing a positional displacement between the optical axis of LED 22 and the central axis of the light guide plate 11 in the thickness direction of the light-receiving end surface 14.

Figure 2:
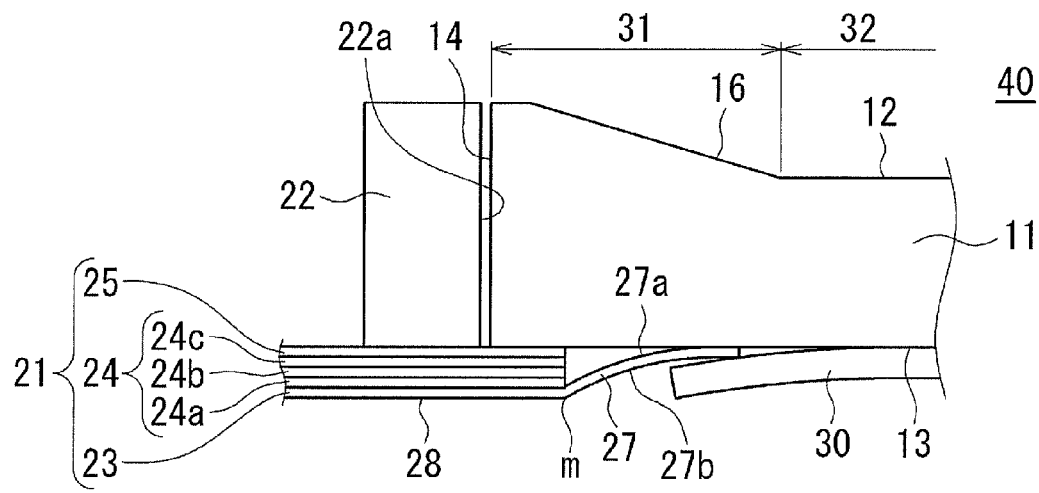
FIG. 2 illustrates a side view of the main part of a first modified example of the planar illumination apparatus according to the first embodiment of the present invention (second and third aspects).
Figure 3:
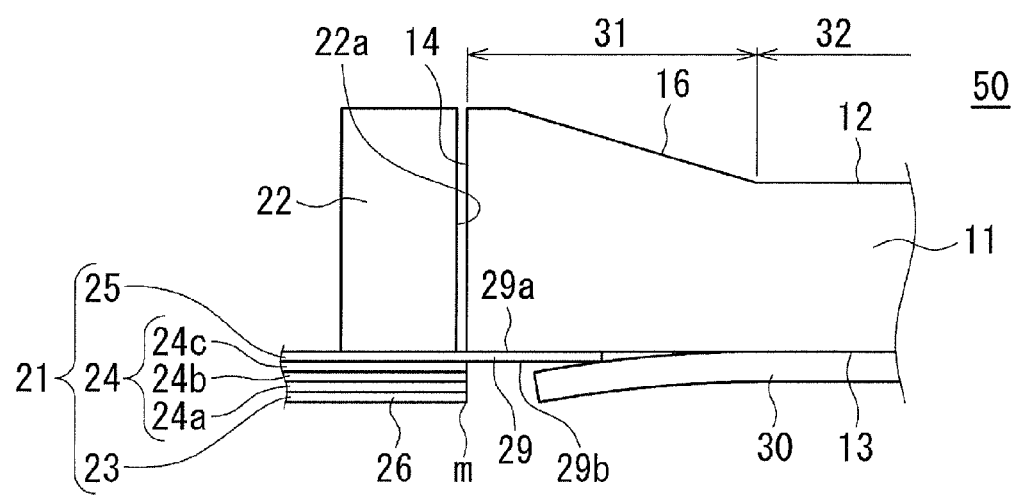
FIG. 3 illustrates a side view of the main part of a second modified example of the planar illumination apparatus according to the first embodiment of the present invention (fourth aspect).
Figure 4:
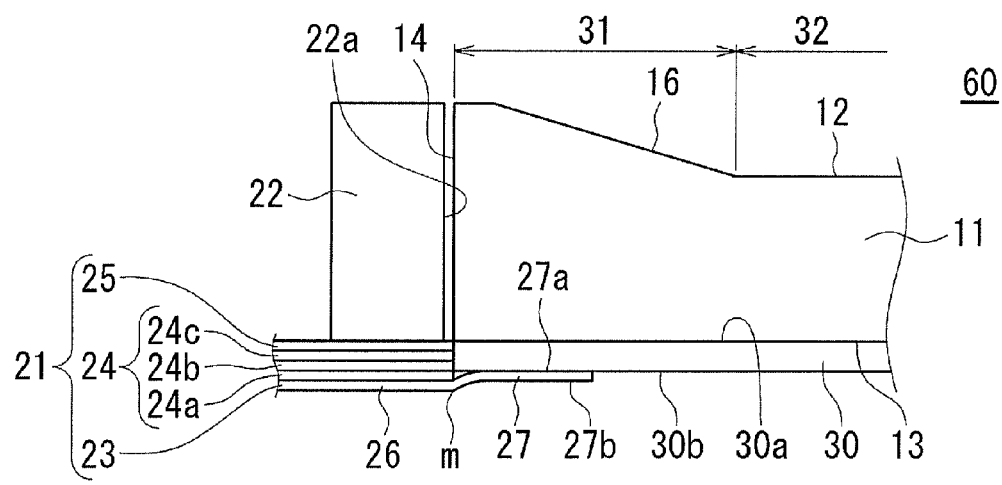
FIG. 4 illustrates a side view of the main part of a third modified example of the planar illumination apparatus according to the first embodiment of the present invention (fifth aspect).
Figure 5:
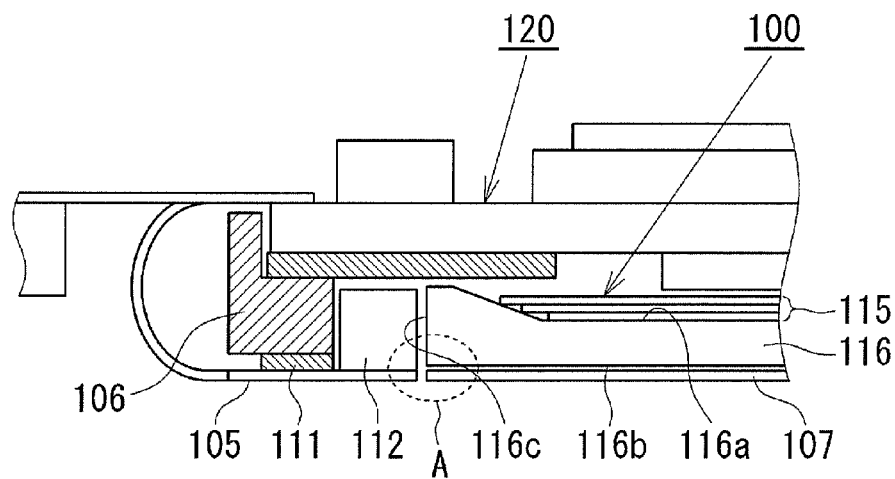
FIG. 5 illustrates a cross-sectional side view of an example of the related art planar illumination apparatus.
Figure 6:
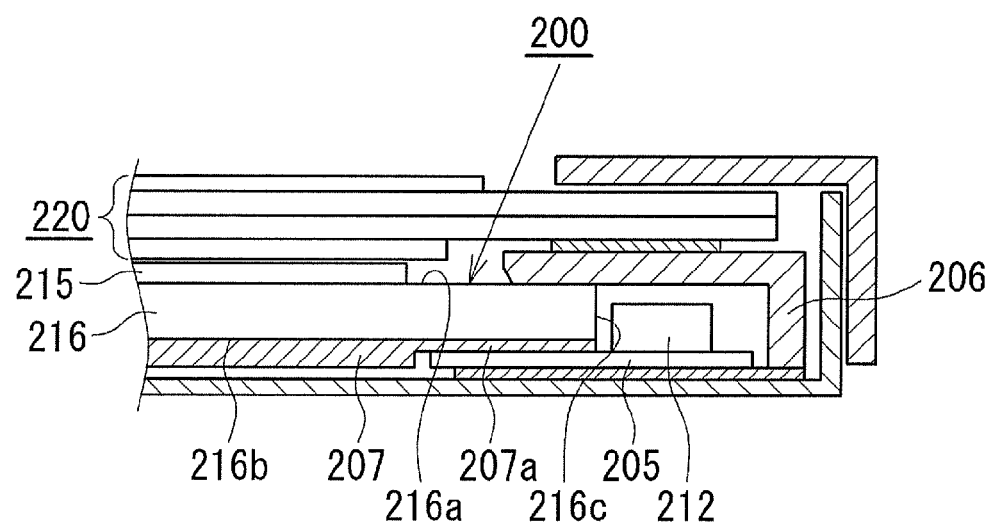
FIG. 6 illustrates a cross-sectional side view of another example of the related art planar illumination apparatus.

Referring now to FIGS. 2 to 4, modified examples of the planar illumination apparatus according to one embodiment of the present will be described. In the following description, structural elements common to the planar illumination apparatus 10 depicted in FIG. 1 will be referenced with the same reference numerals and the description of the overlapped portions will be suitably omitted to predominantly describe the difference from the planar illumination apparatus 10 depicted in FIG. 1.

A planar illumination apparatus 40 (second and third aspects) depicted in FIG. 2 is different from the planar illumination apparatus 10 (first aspect) in that the forward side edge of the mounting portion, which serves as a boundary m between the mounting portion 28 of FPC 21 and the thin portion 27 is located at a position ahead of the light-receiving end surface 14 of the light guide plate 11. This planar illumination apparatus 40 makes effective use of a forward-located portion of LED 22 (portion extending from one corresponding to the light-emitting surface 22a to the boundary m) on the mounting portion 28 of FPC 21 as a wiring space.

A planar illumination apparatus 50 (fourth aspect) depicted in FIG. 3 is different from the planar illumination apparatus 10 (first aspect) in that the thin portion 29 of FPC 21 is configured as a single-layered structure constructed of only a cover film 25. Preferably, the FPC 21 is configured such that the entire surface 29a of the thin potion 29, which is on the light guide plate 11 side, is disposed on the reflective flat surface 13 of the light guide plate 11. The planar illumination apparatus 50 is able to have a large contact area between the FPC 21 and the light guide plate 11. Thus, it becomes possible to enhance the adhesion strength between the FPC 21 and the light guide plate 11 (or fixing strength if the thin portion 29 is fixed on the light guide plate 11 by adhesion, sticking, or the like).

Furthermore, even in the case that the thin portion 29 of FPC 21 is prepared as a single-layered structure constructed of only the cover film 25, the production process for manufacturing ordinary FPCs which do not have thin portions (for example, the process includes lamination of each layer, etching, cutting, and so on) is just carried out so that a single-layered portion to be provided as a thin portion 29 can be retained in the base film 25. Thus, the FPC 21 having the thin portion 27 can be easily, cost-effectively produced in an ordinal production process without any additional step, material, and the like.

Furthermore, in the planar illumination apparatus 50, the thin portion 29 of FPC 21 is formed of a cover film 25, there is no need of bending the thin portion 29. Besides, the LED 22 can be arranged along the light-receiving end surface 14 without causing a positional displacement between the optical axis of LED 22 and the central axis of the light guide plate 11 in the thickness direction of the light-receiving end surface 14.

A planar illumination apparatus 60 (fifth aspect) depicted in FIG. 4 is different from the planar illumination apparatus 10 (first aspect) in that the tip side of the thin portion 27 of FPC 21 is disposed on the surface 30b of the reflective sheet 30 which is opposite to the light guide plate 11 side thereof. In the planar illumination apparatus 60, the tip end portion of the reflective sheet 30 cannot be bent because it overlaps the thin portion 27 of FPC 21. Thus, the reflection characteristic uniformity of the reflective sheet 30 can be improved because the entire surface of the reflective sheet 30 on the light guide plate 11 side can be brought into contact with the reflective flat surface 13.

Furthermore, in the planar illumination apparatus 60, arranging the mounting portion 26 of FPC 21 on a predetermined position causes a level difference between the tip side of the thin portion 27, which is disposed on the surface 30b of the reflective sheet 30 opposite to the light guide plate 11, and the base side (the mounting portion 26 side) thereof. In this case, such a level difference can be eliminated by bending of the thin portion 27. Therefore, the mounting portion 26 of FPC 21 is disposed on a predetermined position. Besides, the LED 22 can be arranged along the light-receiving end surface 14 without causing a positional displacement between the optical axis of LED 22 and the central axis of the light guide plate 11 in the thickness direction of the light-receiving end surface 14. In this case, comparing with the case of the planar illumination apparatus 10, the planar illumination apparatus 60 has a smaller level difference to be eliminated by the bending of the thin portion 27 due to the thickness of the reflective sheet 30. Thus, a reaction force due to the bending of the thin portion 27 becomes small. Therefore, it is also advantageous in that the tip side of the thin portion 27 can be difficult to be peeled off from the reflective sheet 30.

Furthermore, FIG. 4 illustrates an example in which the thickness of the reflective sheet 30 is smaller than that of the FPC 21. However, the case where the reflective sheet 30 has a thickness larger than that of the FPC 21 is also functioned in a similar manner. If the reflective sheet 30 and the FPC 21 are the same in thickness, it is needless to say that, like the planar illumination apparatus 50 depicted in FIG. 3, the FPC 21 can be disposed at a predetermined position without need of the bending of the thin portion 27.

Here, in any one of the planar illustration devices 10, 40, 50, and 60 depicted in FIGS. 1 to 4, the surface 27a, 29a of the thin portion 27, 29 facing the light guide plate 11 may be printed white or black (sixth aspect). By means of this, it may be able to prevent light, which is incident on the thin portion 27, 29 from the LED 22 (for example, through the reflective flat surface 13 of the light guide plate 11), from leaking out through the thin portion 27, 29 by absorption (for example, in the case of black-printing) or by reflection (for example, in the case of white-printing).

In this case, like the planar illumination apparatus 40 depicted in FIG. 2, when the boundary m between the mounting portion 28 and the thin portion 27 is located anterior to the light-receiving end surface 14 of the light guide plate 11, it is preferred that the surface of the mounting portion 28 facing the reflective flat surface 13 of the light guide plate 11 be also printed white or black.

Furthermore, in the above embodiments, even though illustration and description have been omitted, each of the planar illumination apparatuses 10, 40, 50, and 60 may further include any appropriate structural elements, such as a housing frame in the form a frame that surrounds the periphery of the light guide plate 11; a diffusion sheet to be laminated on the output flat surface 12 side of the light guide plate 11; and a shading sheet disposed above the vicinity of the light-receiving end surface 14 and the vicinity of the end surface facing the light-receiving end surface 14.

The invention claimed is:

1. A planar illumination apparatus comprising:
a light source;
a light guide plate having a light-receiving end surface arranged facing the light source, an output flat surface for planarly outputting light received through the light-receiving end surface and a reflective flat surface facing the output flat surface;
a reflective sheet disposed on the reflective flat surface side of the light guide plate; and
a flexible printed circuit board disposed on substantially the same plane as that of the reflective sheet, the flexible printed circuit board mounting the light source,
wherein the flexible printed circuit board has a mounting portion on which the light source is mounted and a thin portion which extends from a forward side edge of the mounting portion and is formed thinner than the mounting portion, and
wherein at least one part of the thin portion and an end portion of the reflective sheet are overlapped with each other.

2. The planar illumination apparatus according to claim 1, wherein the flexible printed circuit board comprises a base film, a wiring layer formed on the base film and a cover film laminated on the wiring layer,
wherein the thin portion comprises the base film, and
wherein at least tip side of the thin portion is disposed on the reflective flat surface of the light guide plate, and further thereon the end portion of the reflective sheet is overlapped.

3. The planar illumination apparatus according to claim 2, wherein the forward side edge of the mounting portion on a boundary between the mounting portion and the thin portion is located anterior to the light-receiving end surface of the light guide plate.

4. The planar illumination apparatus according to claim 1, wherein the flexible printed circuit board includes a base film, a wiring layer formed on the base film and a cover film laminated on the wiring layer, wherein the thin portion comprises the cover film, and
wherein the thin portion is disposed on the reflective flat surface of the light guide plate, and further thereon the end portion of the reflective sheet is overlapped.

5. The planar illumination apparatus according to claim 1, wherein the flexible printed circuit board includes a base film, a wiring layer formed on the base film and a cover film laminated on the wiring layer,
wherein the thin portion comprises the base film, and
wherein the end portion of the reflective sheet is disposed on the reflective flat surface of the light guide plate, and further thereon at least tip side of the thin portion is overlapped.

6. The planar illumination apparatus according to claim 1, wherein the thin portion is printed in white or black on its surface facing the reflective flat surface of the light guide plate.

7. The planar illumination apparatus according to claim 2, wherein the thin portion is printed in white or black on its surface facing the reflective flat surface of the light guide plate.

8. The planar illumination apparatus according to claim 3, wherein the thin portion is printed in white or black on its surface facing the reflective flat surface of the light guide plate.

9. The planar illumination apparatus according to claim 4, wherein the thin portion is printed in white or black on its surface facing the reflective flat surface of the light guide plate.

10. The planar illumination apparatus according to claim 5, wherein the thin portion is printed in white or black on its surface facing the reflective flat surface of the light guide plate.

* * * * *